Patented July 1, 1952

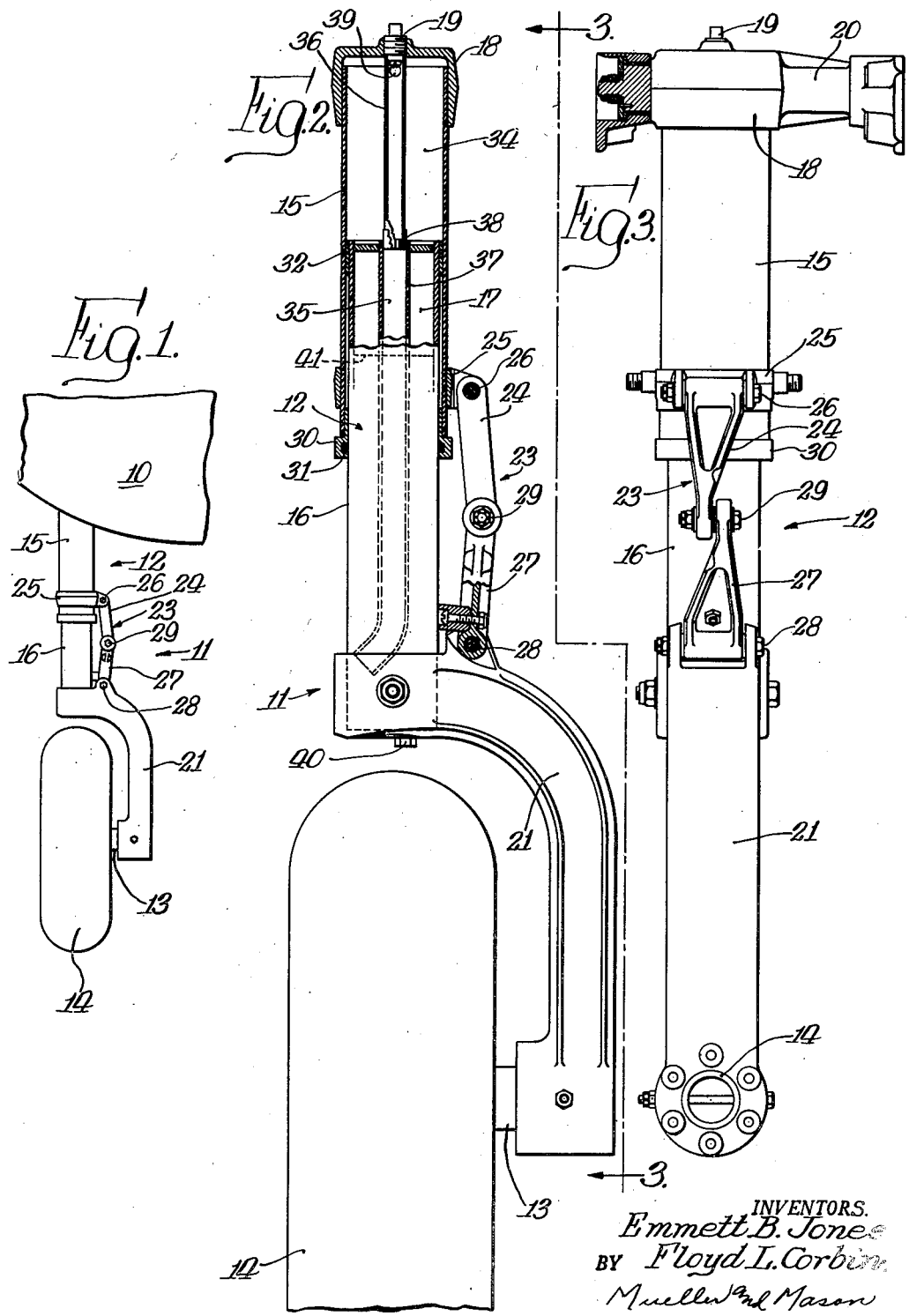

2,601,982

UNITED STATES PATENT OFFICE 2,601,982

SHOCK ABSORBING DEVICE

Emmett B. Jones and Floyd L. Corbin, Tulsa, Okla., assignors to Engineering Laboratories, Inc., Tulsa, Okla., a corporation of Oklahoma Application October 12, 1946, Serial No. 702,976

12 Claims. (Cl. 267—64)

The present invention relates to a shock absorbing device and more particularly to a shock absorbing device which is particularly adaptable for use on aircraft in connection with the landing gear thereof.

Shock absorbing devices used heretofore and particularly in connection with landing struts for aircraft and the like have generally employed a hydraulic fluid which is forced through a suitable orifice of some sort together with spring means in combination therewith for performing the shock absorbing function. In other words, relative movement between the members making up the shock absorbing device is resisted in prior art devices by spring means or spring means in combination with the restricted flow of a fluid. For proper operation of such devices, it was necessary critically to proportion the size of the orifice, the edges of which often become worn under heavy pressures due to the flow of fluid therethrough so as to materially change the initial calibration thereof. In addition, a spring must be provided having a predetermined design. It would be desirable to provide a shock absorbing device such as a strut for an airplane in which very satisfactory operation is obtained without the use of any spring whatsoever and furthermore, although an orifice is employed, its control is not so critical as in prior art devices.

Accordingly, it is an object of the present invention to provide a new and improved shock absorbing device.

It is another object of the present invention to provide a shock absorbing device employing hydraulic and pneumatic means but employing no spring of any kind.

It is a further object of the present invention to provide a shock absorbing device, particularly applicable for use with aircraft, in which relative movement between the parts is resisted by the displacement of a hydraulic fluid against a pneumatic pressure and rebound of the device is prevented by virtue of the momentum of a long, high velocity column of hydraulic fluid.

Still another object of the present invention is to provide a shock absorbing device including a pneumatic and a hydraulic chamber positioned remotely from one another so as to be interconnected by a relatively long fluid passageway of small cross-sectional area and wherein upon operation of the device a fairly high velocity flow of fluid through said passageway is produced, said fluid having sufficient momentum to resist changes in the direction of relative movement of said members.

It is a further object of the present invention to provide a strut for an airplane comprising relatively movable parts whose relative movement is resisted by hydraulic and pneumatic means including a relatively long fluid passageway defined by a pair of relatively movable members.

It is still another object of the invention to provide an improved, low cost cylinder assembly of such construction that internal machining of the cylinder walls throughout the length of the cylinder member is not required.

Further objects and advantages of the present invention will become apparent as the following description proceeds and the features of novelty which characterize this invention will be pointed out with particularity in the claims annexed to and forming a part of this specification.

For a better understanding of the present invention, reference may be had to the accompanying drawing in which:

Fig. 1 illustrates an embodiment of the present invention shown in operative relation to a portion of the airplane with which it may be associated.

Fig. 2 is an enlarged view, partly in section, of a portion of the device shown in Fig. 1; and Fig. 3 is a view taken on line 3—3 of Fig. 2 with the landing wheel of Fig. 2 removed therefrom.

It should be understood that the shock absorbing device to be described hereinafter is applicable to many different arrangements where shock absorbing devices are employed. It is particularly adaptable for use in connection with the landing gear of aircraft and accordingly, the invention has been specifically disclosed in connection with such application. It is intended in the appended claims to cover all applications of the present invention whether associated with aircraft landing gear or not.

Referring now to the drawing, there is illustrated a portion of an aircraft structure generally indicated at 10 from which extends the airplane landing gear generally designated at 11 comprising a strut portion 12 suitably disposed between the aircraft structure 10 and an axle 13 upon which is rotatably mounted a suitable landing wheel 14. It will be understood that an airplane would be provided with more than one such strut as mentioned above but only one has been illustrated in order to bring out the present invention.

Referring now to Figs. 2 and 3 of the drawing, it is observed that the present improved strut 12 comprises a pair of relatively movable members 15 and 16. The member 15 is effectively a cylinder within which the member 16 is reciprocally movable so that the member 16 may be specifically designated as a piston member. Actually, the member 16 is also provided with a hollow chamber portion 17 therein, the purpose of which will become apparent as the following description proceeds. As illustrated in the drawings, the members 15 and 16 are arranged with their longitudinal axes coincident and extending in a vertical direction whereby relative movement of the members 15 and 16 is in a direction along such vertical axes. The upper end of the cylinder 15 is closed by any suitable means such, for example, as the cap member 18. Preferably a filling plug 19 is provided in the cap member 18. The cap member 18 is adapted to be connected by suitable mounting means generally indicated at 20 in Fig. 3 of the drawing for attaching the strut associated therewith to the aircraft. It will be understood that the mounting means 20 forms no part of the present invention and any suitable means for this purpose may be employed.

In order to transmit the force from the aircraft 10 to the landing wheel 14, the lower end of the piston member 16 is preferably connected to a suitable casting or the like 21 which supports the axle 13. With the arrangement described thus far, it is apparent that relative rotation between cylinder 15 and piston 16 would cause landing wheel 14 to orientate itself in various directions other than a particular desired direction. To prevent such relative rotation of the cylinder 15 and the piston 16, suitable means generally indicated at 23 are provided which must not interfere with relative movement between cylinder 15 and piston 16 as far as movement along the longitudinal axes of these members are concerned. The means 23 comprises a link 24 suitably fastened to the cylinder 15 as by means of a collar 25. The link 24 has one end thereof pivotally connected to the collar 25 as indicated at 26. A link 27 is provided having one end pivotally connected to the casting 21 as indicated at 28.

The other ends of the links 24 and 27 are interconnected as indicated at 29 so as to form a toggle. This toggle will permit relative movement along the longitudinal axes of members 15 and 16 but will resist relative rotation of members 15 and 16. With this arrangement, it is obvious that the landing wheel 14 will always be orientated in a predetermined manner relative to the aircraft. At the same time, the shock absorbing device of the present invention to be described hereinafter is free to perform its function.

From the above description and an examination of Fig. 2 of the drawing, it will be apparent that the cylinder 15 and the piston 16 effectively comprise a pair of telescoped cylindrical members. In order to prevent the escape of fluid between the telescoped surfaces, the lower end of cylinder 15 is provided with an enlarged flanged bearing ring 30 in the internal bearing surface of which there is defined an annular recess for accommodating a suitable sealing washer 31 in sealing engagement with the piston 16. The upper end of piston 16 slides through a second bearing ring 32 adapted to slide along the outer wall of the piston 16, thereby effectively guiding the relative movement of the members 15 and 16.

In accordance with one feature of the present invention, expensive and laborious internal machining of the cylinder member 15 throughout its length is eliminated by employing the small internally machined rings 30 and 32 to provide the necessary piston bearing surfaces at spaced points longitudinally of the cylinder member 15. These relatively small rings may easily be machined to the required internal and external dimensions prior to assembly with the cylinder member 15. The problem involved in using rings of this character to provide piston bearing surfaces is that of fixedly securing the same, particularly the ring 32, to the cylinder member 15 internally of this member. In accordance with the present invention this problem is obviated by forming a copper brazed connection between the external surface of each ring and the internal surface of the cylinder member. To accomplish this end the rings 30 and 32, which are externally machined to form a press fit with the internal wall of the cylinder member, are first assembled with the cylinder member 15 by driving the same into place. Following this, copper brazing material preferably in wire form, is placed around the upper edge of each ring internally of the cylinder member 15 and the entire assembly is introduced into a high temperature brazing oven to effect the desired brazed union between the cylinder member and the external walls of the rings 30 and 32. The described technique of providing the necessary piston bearing surfaces within the cylinder member 15 may be practiced on a high production basis with a very substantial saving in the overall cost of the entire device.

As indicated above, the portion of the cylinder 15 not filled with the piston 16 defines a fluid chamber 34 which is preferably filled with a suitable hydraulic strut fluid or the like often referred to as "oleo." In accordance with the present invention, the remote ends of the fluid chambers 34 and 17 are interconnected by a fluid passageway generally indicated at 35 which fluid passageway is defined by a pair of telescoping tubular members 36 and 37. The tubular member 36 is supported from the upper end of the cylinder 15 and extends downwardly therein into telescoping relationship with the tubular member 37 which is supported from the upper end of the piston 16 and extends into the chamber 17. The lower end of the tubular member 36 is provided with an orifice 38. On the other hand, the upper end of the tubular member 36 is provided with suitable openings such as 39 whereby hydraulic strut fluid from the chamber 34 may pass into the tubular member 36 and thence through the tubular member 37 into the chamber 17. Also in accordance with the present invention, the chamber 17 preferably contains a predetermined amount of air under pressure under normal conditions. To this end, suitable means for supplying air to the chamber 17 are provided. These means may assume any suitable form and the specific construction thereof forms no part of the present invention. The reference numeral 40 in Fig. 2 of the drawing designates generally the means for supplying compressed air to the chamber 17 and preferably comprises an air valve through which air under pressure, as for example 150 pounds per square inch, may be supplied to the chamber 17. Under normal conditions when the aircraft is in flight for example, the air pressure in the chamber 17 is sufficient to displace some of the hydraulic or incompressible fluid in chamber 17 into the upper chamber 34 through the passageway 35 so that the level of this fluid remaining in chamber 17 may be indicated by the line 41 in Fig. 2 of the drawing. With this arrangement, the lower end of the tube 37 is always below the level of the hydraulic fluid thereby preventing the percolation of air from the chamber 17 through the tubular passageway 35 up into the chamber 34. It will be understood that when the aircraft is in flight, the strut is fully extended by virtue of the compressed air in the chamber 17. The amount of compressed air provided in this chamber is determined by the desired strut extension when the plane is resting on the ground.

When the plane lands, the weight and impact thereof on the landing wheel 14 causes the cylinder 15 to move downwardly relative to the piston 16, thereby displacing the incompressible fluid in the chamber 34. This fluid is forced through the openings 39 in the tube 36 and the orifice 38 against the pressure of the air in the fluid chamber 17. The energy of impact is absorbed by the friction of the oil in passing through the relatively long passageway 35 as well as the friction of the fluid in passing through the orifice 38. An important feature of the present invention resides in the employment of the relatively long column of incompressible fluid in passageway 35 which is caused to move at a relatively high velocity upon relative movement of the members 15 and 16 when the aircraft lands. This long column of oil has a substantial momentum by virtue of the relatively high velocity of movement thereof and this energy E of the moving body may be defined by the equation: $E = MV^2$; where M is the mass of the moving column of oil in suitable units and V is the velocity in similar appropriate units. The mass of the moving oil is of course dependent upon the cross-sectional area of the fluid passageway 35 and the length of this passageway. The momentum of this column of oil is very effective in the present invention in resisting rebound of the shock absorbing device since a considerable amount of energy is required to overcome the momentum of this moving column of incompressible fluid. In the prior art devices where only an orifice was employed, a relatively small mass of oil was moved at a high velocity and consequently, the momentum was relatively unimportant. However, in the present arrangement where a very long column of oil is employed, the mass becomes substantial and the velocity is high so that a substantial amount of kinetic energy is present to resist any sudden change in the direction of movement of the strut parts with the consequent result of very smooth impact absorbing action.

With the arrangement described above, any air which is entrapped in the upper chamber 34 accumulates in the upper portion of the cylinder 15. This air is flushed through the passageway 35 and back into the air chamber 17 where it belongs merely by the telescoping action of the members 15 and 16 on a subsequent operation thereof.

The telescoped portions of the tubular members 36 and 37 need not be provided with any sealing means and suitable bronze bushings for this purpose have been found to be very satisfactory. The area of fluid escape is so small as to be relatively inconsequential.

In view of the detailed description included above, the operation of the shock absorbing device of the present invention will be understood by those skilled in the art and no further discussion thereof will be included herewith except to point out that by the use of a compressible fluid and an incompressible fluid, the relative movement between the parts of the shock absorber are resisted to the desired extent. In addition, the use of a high velocity, long moving column of hydraulic fluid to resist any sudden changes in direction of movement of the parts of the shock absorbing device substantially prevents rebound. The parts are furthermore simple to manufacture and lend themselves very readily to high speed assembly and foolproof operation.

While there has been shown and described a particular embodiment of the present invention, it is to be understood that the arrangement disclosed is merely illustrative of the invention. It will, of course, be apparent to those skilled in the art that changes and modifications may be made without departing from the present invention, and it is aimed in the appended claims to cover all such changes and modifications as fall within the true spirit and scope of the present invention.

What is claimed as new and desired to be secured by Letters Patent of the United States is:

1. In a shock-absorbing device for airplane landing gear comprising interfitting cylinder and piston members, means defining a hydraulic fluid chamber in one of said members, means defining a pneumatic chamber in the other of said members, means defining a relatively long continuously open passageway including an orifice portion extending directly to the remote ends of said chambers regardless of the relative positions of said cylinder and piston members so that a long column of relatively high velocity hydraulic fluid moves through said passageway in response to relative movement in one direction of said piston and cylinder members, the length of said column being determined by the distance between the remote ends of said chambers, said long moving column of hydraulic fluid in said passageway having such momentum as to prevent rebound of said device.

2. In a shock-absorbing device comprising interfitting cylinder and piston members, means defining a hydraulic fluid chamber in one of said members, means defining a chamber in the other of said members, means defining a relatively long continuously open passageway directly interconnecting the remote ends of said chambers so that a column of relatively high velocity hydraulic fluid as long as the distance between said remote ends regardless of the relative position of said interfitting cylinder and piston members moves through said passageway in response to relative movement in one direction of said piston and cylinder members, said long moving column of hydraulic fluid in said passageway having such momentum as to prevent sudden changes in relative movement of said piston and cylinder members.

3. In a shock absorbing device comprising a pair of telescoping relatively movable cylindrical members, an incompressible fluid contained in one of said members so as to resist relative movement in one direction of said members; a chamber in the other of said cylindrical members, means defining a continuously open fluid passageway for conveying said incompressible fluid to said chamber in response to relative movement in said one direction of said members, said passageway comprising the sole path for fluid flow between said chamber and said one member, said passageway directly interconnecting at all times the remote portions of said chamber and said one member, the momentum of the fluid conveyed to said chamber by said passageway being sufficient to prevent sudden changes in direction of the relative movement between said members, the length of said column being determined by the distance between the remote ends of said one member and said chamber, and means in said chamber for returning said fluid through said passageway when no external forces are applied to said members.

4. In a shock absorbing device comprising a pair of relatively movable members including a cylinder having a closed end, a cylindrical hollow piston member arranged in telescopic relationship with the other end of said cylinder, an incompressible fluid contained in said cylinder so as to resist further movement of said piston into said cylinder, a substantially closed fluid chamber within said hollow piston member, means defining a continuously open fluid passageway leading from said closed end of said cylinder into said chamber to a point substantially the most remote from said cylinder and outside said cylinder to provide a long moving column of incompressible fluid flowing from said cylinder to said chamber in response to a force causing movement of said piston into said cylinder, the direction of movement of said column depending upon the direction of relative movement of said pair of members, the momentum of said column moving in said passageway being sufficient to prevent sudden changes in direction of the relative movement due to changes in said force.

5. In a shock absorbing strut for aircraft comprising a vertically positioned cylinder, a hollow piston reciprocal in the lower end of said cylinder, said cylinder and piston defining a fluid chamber at the upper end of said cylinder, an incompressible fluid in said fluid chamber, a pneumatic chamber in said hollow piston, means defining a continuously open fluid passageway extending from the upper end of said fluid chamber to the lower end of said pneumatic chamber, said fluid passageway being the sole interconnection between said chambers, a compressible fluid under pressure in said pneumatic chamber for producing a maximum length of said strut when said aircraft is in flight, means for causing said incompressible fluid to flow through said passageway and into said pneumatic chamber when the forces encountered in landing said aircraft effectively move said piston further into said cylinder, and means including said passageway for resisting said movement of said piston relative to said cylinder, the lower end of said passageway being always submerged in a small quantity of incompressible fluid always contained in said pneumatic chamber thereby substantially to prevent the flow of said compressible fluid into said fluid chamber.

6. In a shock absorbing device comprising a pair of telescoping relatively movable cylindrical members, an incompressible fluid contained in one of said members so as to resist relative movement in one direction of said members, a chamber in the other of said cylindrical members, means defining a fluid passageway for conveying said incompressible fluid to said chamber in response to relative movement in said one direction of said members, said fluid passageway directly interconnecting the remote portions of said chamber and said one member and being the sole path for fluid flow therebetween, the length of said fluid passageway being determined by the distance between substantially the most remote portions of said chamber and said one member regardless of the relative positions of said telescoping movable cylindrical members, the momentum of the fluid conveyed to said chamber by said passageway being sufficient to prevent sudden changes in direction of the relative movement between said members, and air under pressure in said chamber for returning said fluid through said passageway when no external forces are applied to said members.

7. In a shock absorbing device comprising a pair of telescoping relatively movable cylindrical members, an incompressible fluid contained in one of said members, a chamber in the other of said cylindrical members, means defining a continuously open fluid passageway including an orifice for conveying said incompressible fluid to said chamber in response to relative movement in one direction of said members, the flow of fluid through said passageway and orifice resisting relative movement in said one direction of said member, said passageway comprising the sole path for fluid flow between said chamber and said one member and extending directly between the most remote portions of said chamber and said one member regardless of the relative position of said pair of telescoping relatively movable cylindrical members, the momentum of the fluid conveyed to said chamber by said passageway being sufficient to prevent sudden changes in direction of the relative movement between said members, and a compressible fluid in said chamber for further resisting relative movement in said one direction of said members and returning said incompressible fluid through said passageway when no external forces are applied to said members.

8. In a shock absorbing device comprising a pair of relatively movable members including a cylinder having a closed end, a cylindrical hollow piston member arranged in telescopic relationship with the other end of said cylinder, an incompressible fluid contained in said cylinder, a substantially closed fluid chamber within said hollow piston member, means defining a continuously open fluid passageway extending directly from the closed end of said cylinder into said chamber to a fixed point relative to said chamber remote from said cylinder to provide a path for a long moving column of incompressible fluid flowing from said cylinder to said chamber in response to a force causing movement of said piston into said cylinder, the length of said column being determined by the distance between substantially the most remote portion of said cylinder and said chamber regardless of the relative position of said cylinder and piston thereby greatly retarding and resisting such movement of said piston into said cylinder, the momentum of said column moving in said passageway being sufficient to prevent sudden changes in direction of the relative movement of said members.

9. In a shock absorbing device comprising a pair of relatively movable members including a cylinder having a closed end, a cylindrical hollow piston member arranged in telescopic relationship with the other end of said cylinder, an incompressible fluid contained in said cylinder so as to resist further movement of said piston into said cylinder, a substantially closed fluid chamber within said hollow piston member, a fluid passageway leading from said closed end of said cylinder into said chamber at a point remote from said cylinder to provide a path for a long moving column of incompressible fluid flowing from said cylinder to said chamber in response to a force causing movement of said piston into said cylinder, a compressible fluid contained in said chamber, and means comprising a predetermined amount of said incompressible fluid contained in said chamber to close the end of said passageway in said cylinder, whereby said compressible fluid is substantially prevented from flowing through said passageway into said cylinder.

10. In a shock absorbing strut for aircraft comprising a vertically positioned cylinder, a hollow piston reciprocal in the lower end of said cylinder, said cylinder and piston defining a fluid chamber at the upper end of said cylinder, an incompressible fluid in said fluid chamber, a pneumatic chamber in said hollow piston, a pair of telescopically related tubes defining a fluid passageway extending from the upper end of said fluid chamber to the lower end of said pneumatic chamber, a compressible fluid under pressure in said pneumatic chamber for producing a maximum length of said strut when said aircraft is in flight, means for causing said incompressible fluid to flow through said passageway and into said pneumatic chamber when the forces encountered in landing said aircraft effectively move said piston further into said cylinder, means including an orifice in said passageway for resisting said movement of said piston relative to said cylinder, and a linkage mechanism fastened to said cylinder and said piston permitting relative reciprocal movement of said piston and said cylinder but preventing all other relative movement thereof.

11. In a shock absorbing device comprising a pair of telescoping relatively movable cylindrical members, an incompressible fluid contained in one of said members so as to resist relative movement in one direction of said members, a chamber in the other of said cylindrical members, means defining a fluid passageway directly connecting the most remote ends of said chamber and said one member regardless of the relative position of said pair of telescoping movable cylindrical members for conveying said incompressible fluid to said chamber in response to relative movement in said one direction of said members, said passageway being the sole connection between said chamber and said one member for the interchange of fluid therebetween and interconnecting remote portions thereof, the momentum of the fluid conveyed to said chamber by said passageway being sufficient to prevent sudden changes in direction of the relative movement between said members, means in said chamber for returning said fluid through said passageway when no external forces are applied to said member, and means for preventing other than telescopic relative movement of said members.

12. In a shock absorbing device comprising a pair of relatively movable members including a cylinder having a closed end, a cylindrical hollow piston member arranged in telescopic relationship with the other end of said cylinder, an incompressible fluid contained in said cylinder so as to resist further movement of said piston into said cylinder, a substantially closed fluid chamber within said hollow piston member, means defining a single fluid passageway leading directly from said closed end of said cylinder into said chamber at a point substantially the most remote from said cylinder regardless of the relative position of said relatively movable cylinder and piston to provide a long moving column of incompressible fluid flowing from said cylinder to said chamber in response to a force causing movement of said piston into said cylinder, said passageway being the sole path for fluid flow between said chamber and said cylinder, the momentum of said column moving in said passage-way being sufficient to prevent sudden changes in direction of the relative movement due to changes in said force, and means for preventing relative rotating movement between said members without interfering with telescopic movement thereof.

EMMETT B. JONES.
FLOYD L. CORBIN.

REFERENCES CITED

The following references are of record in the file of this patent:

UNITED STATES PATENTS

| Number | Name | Date |
|---|---|---|
| 1,113,370 | Ostendorf | Oct. 13, 1914 |
| 1,164,182 | Green | Dec. 14, 1915 |
| 1,454,905 | Poindexter | May 15, 1923 |
| 1,792,695 | Lewis | Feb. 17, 1931 |
| 1,918,698 | Gruss | July 18, 1933 |
| 2,248,836 | Wallace | July 8, 1941 |
| 2,348,160 | Thornhill | May 2, 1944 |
| 2,412,885 | Harmon | Dec. 17, 1946 |